United States Patent [19]
Ikegawa et al.

[11] Patent Number: 6,083,410
[45] Date of Patent: Jul. 4, 2000

[54] THIN FILM MAGNETIC HEAD AND PROCESS FOR PRODUCING SAME

[75] Inventors: Yukinori Ikegawa; Takao Koshikawa; Yoshinori Ohtsuka, all of Kawasaki, Japan

[73] Assignee: Fujitsu Ltd., Kawasaki, Japan

[21] Appl. No.: 08/953,186

[22] Filed: Oct. 17, 1997

[30] Foreign Application Priority Data

Jun. 4, 1997 [JP] Japan ................................. 9-146835

[51] Int. Cl.⁷ ........................................................ B44C 1/22
[52] U.S. Cl. ................................ 216/22; 216/41; 360/113
[58] Field of Search .................................. 216/22, 27, 41; 29/603.13, 603.14, 603.15; 360/113

[56] References Cited

U.S. PATENT DOCUMENTS

| | | |
|---|---|---|
| 5,013,394 | 5/1991 | Rolland et al. . |
| 5,250,150 | 10/1993 | Gaud et al. ........................ 216/22 |
| 5,804,085 | 9/1998 | Wu et al. ........................... 216/22 |

FOREIGN PATENT DOCUMENTS

| | | |
|---|---|---|
| 554326 | 3/1993 | Japan . |
| 628629 | 2/1994 | Japan . |
| 7182621 | 7/1995 | Japan . |

*Primary Examiner*—William Powell
*Attorney, Agent, or Firm*—Greer, Burns & Crain, Ltd.

[57] ABSTRACT

A plan or vertical type thin film magnetic head is produced by a process comprising the steps of: forming a gap separator layer of a non-magnetic material on the surface of a substrate, while the forming process is not limited to plating; forming a mask layer on the gap layer; patterning the mask layer to form a shield; etching the gap layer, while the shield functions as a mask, thereby forming a gap wall having a width narrower than that of the shield independent of the resolution degree of the resist; forming a magnetic pole layer of a soft magnetic material on the surface of the substrate by exposing the resist at a time, thereby the formed magnetic pole layer being separated by the gap wall; and, utilizing the gap wall as a magnetic pole gap of the magnetic pole layer.

12 Claims, 11 Drawing Sheets

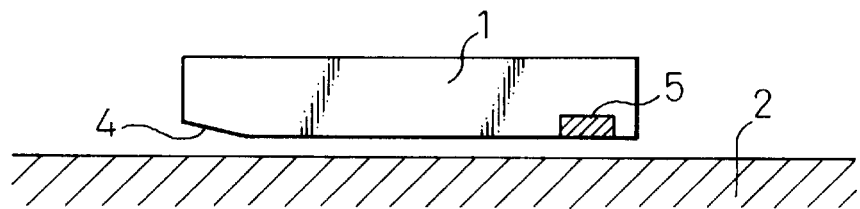
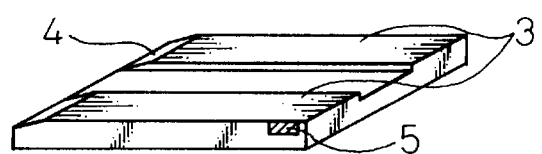
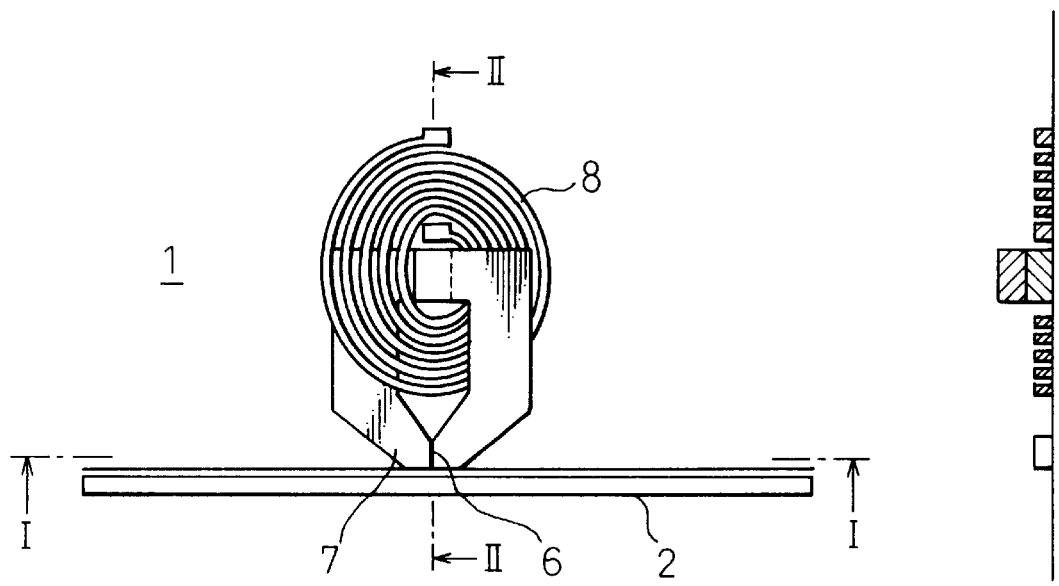
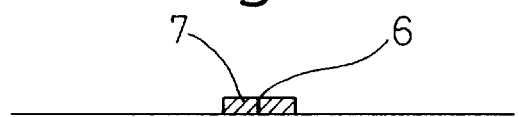

Fig.7A
Fig.7C
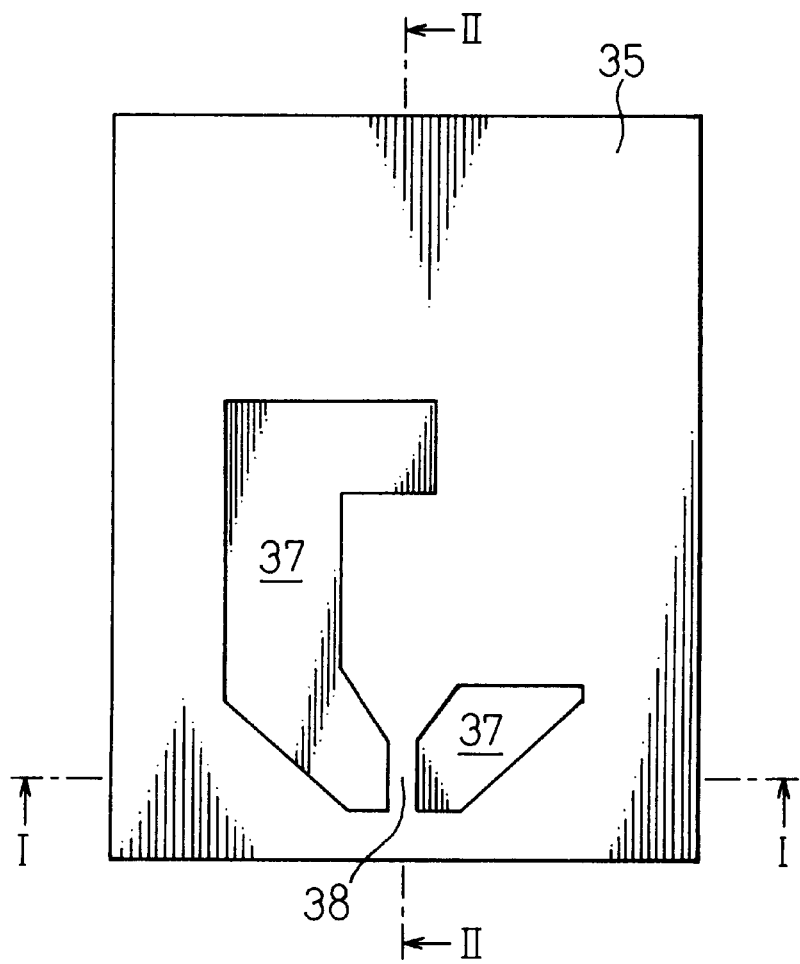
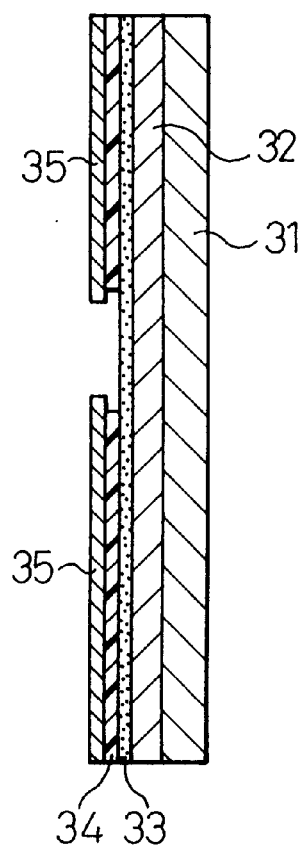
Fig.7B
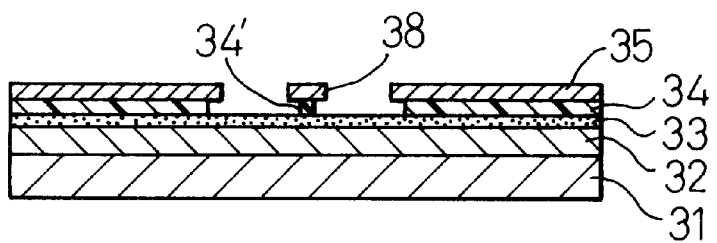

Fig.10A
Fig.10C
Fig.10B
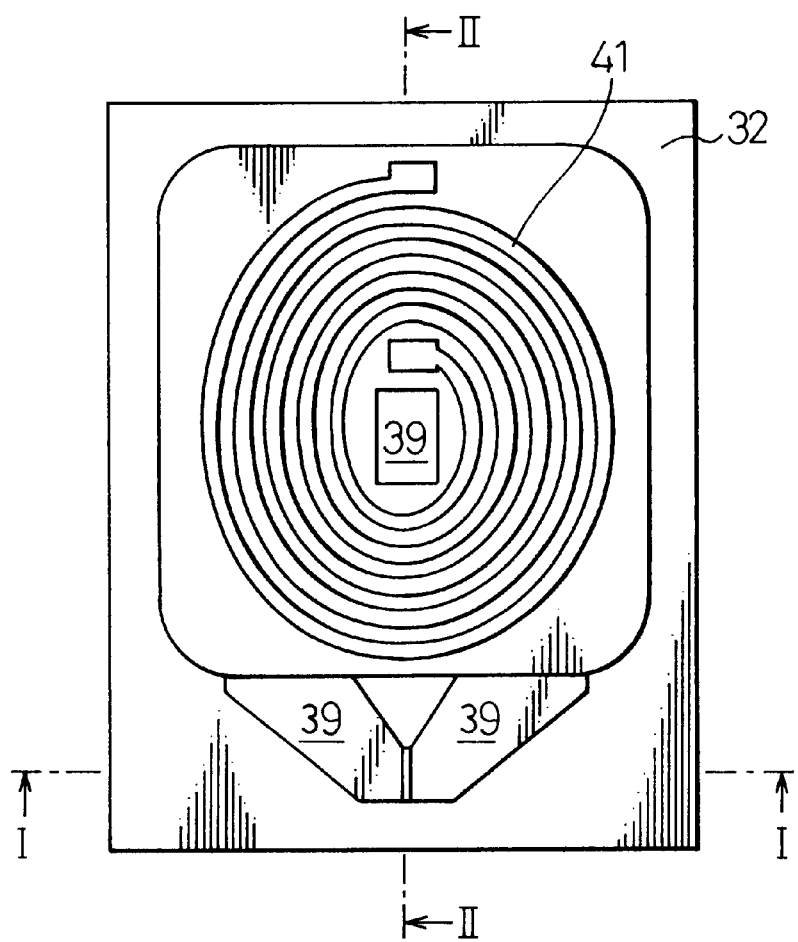
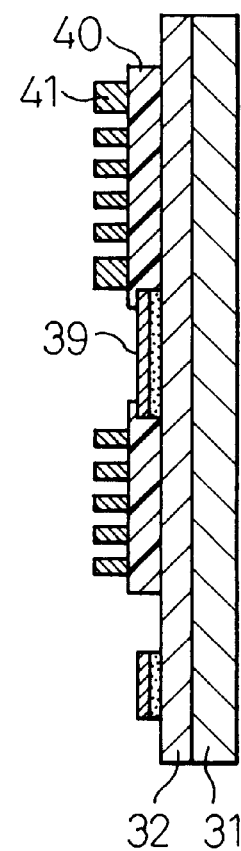
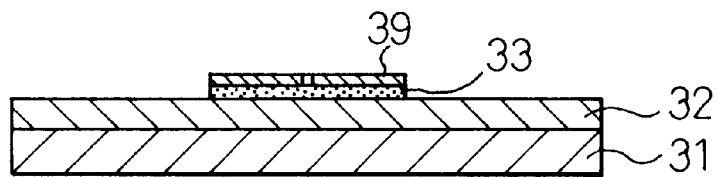

THIN FILM MAGNETIC HEAD AND PROCESS FOR PRODUCING SAME

BACKGROUND OF THE INVENTION

1. Field of The Invention

The present invention relates to a process for producing a thin film magnetic head adapted for use in a magnetic disc device applied as an external storage device of a computer, particularly to a process for forming a so-called write gap separator and a thin film magnetic head produced by means of such a process.

2. Description of the Related Art

A planar type thin film magnetic head as an example of a thin film magnetic head and a process for forming a write gap separator thereof will be described, referring to FIGS. 1A–1C and 2A–2D.

FIG. 1A illustrates a side view of a thin film magnetic head 5 mounted on a slider 1, which flies or floats above the surface of a recording medium 2 when the medium 2 rotates at a high speed. Exchange of magnetic information between the slider 1 and the recording medium 2 to effect so-called read-and-write operation is conducted in this flying state. FIG. 1B illustrates a perspective view of the floating surface of the slider 1, on which a thin film magnetic head 5 is mounted on a rail 3 opposite to the flowing-in tapered end 4 of a pair of rails 3.

FIG. 1C illustrates an enlarged vertical sectional view of the thin film magnetic head 5, in which magnetic poles 7 formed of a looped soft magnetic material having an insulating gap separator 6 on its surface facing the recording medium 2. Coil 8 is formed in an insulating layer combined with the looped soft magnetic material. The magnetic field loop formed within the magnetic poles 7 completes its loop through a magnetic flux leak into the recording medium 2 at the gap 6. A mutual reaction is generated between the electric current flowing in the coil 8, and the magnetic information formed in the recording medium 2 at a location corresponding to the magnetic pole gap 6. Thus, the both operations of magnetic recording and regenerating are achieved.

The process for producing such a thin film magnetic head 5 generally comprises the sequential steps of forming a gap wall 6 and a non-magnetic layer 9 via a so-called scarifying layer on a substrate; then forming an underlayer of the magnetic poles 7; thereafter forming an interlayer insulating layer 10 and a coil layer 8; and finally forming an upper layer of the magnetic poles 7.

FIGS. 2A–2D illustrate a process for forming a gap according to the prior art. After forming a scarifying layer (not shown) on a substrate 11, a plated base layer 13, e.g., of NiFe, a gap layer 14 of a non-magnetic material, e.g., of $SiO_2$, Ti, etc., and a resist layer 15 are formed in this order (FIG. 2A).

The resist layer 15 is patterned by exposing it to an electron beam, then a narrow resist wall corresponding to the gap is formed, with a width of, e.g., about 0.25 $\mu$m (FIG. 2B).

Vertical etching is applied on the gap layer 14, while the patterned resist wall 15' is used as a mask, to form a gap wall 14' and expose the plated base layer 13 (FIG. 2C).

A soft magnetic layer 16 of the magnetic pole material is plated on the substrate having the gap wall 14' and also the exposed plated base layer 13 thereon. Thus, a write gap is completed (FIG. 2D).

As illustrated in FIG. 1C, the lower layer of the magnetic poles 7 approaches the recording medium 2 only at a portion near the gap wall 6, while the lower layer is magnetically insulated from the recording medium 2 via the non-magnetic layer 9 in the other area. Therefore, it is also necessary in practice to have a step of forming a non-magnetic layer 9 in forming the write gap and the magnetic poles. However, such a step is not critical in the present invention and, thus, descriptions of the non-magnetic layer 9 are omitted here and in other portions of the specification.

There are several problems in the above conventional methods of forming a write gap.

First, the electron beam exposure is required to pattern every individual element separately, and thus it requires much more time than the ordinary resist process, in which the entire surface is exposed all at once.

Secondly, the gap width depends on the degree of resolution of resists. It is not possible to obtain a gap width narrower than about 0.25 $\mu$m, which is nearly the lowest limit of resist resolution.

Thirdly, a plating process is usually used to form the magnetic pole. However, magnetic materials adapted for use in the plating process are limited.

SUMMARY OF THE INVENTION

It is an object of the present invention to provide a novel process for forming a write gap, which is narrower than the width of a resist.

It is another object of the present invention to provide a novel process for forming a narrow write gap independent of the resolution degree of a resist.

It is still another object of the present invention to provide a novel process for forming magnetic poles without being limited to the plating process.

It is a further object of the present invention to provide a thin film magnetic head obtained by means of the process set forth above.

Other objects and advantages of the present invention will become further apparent from the following description of the present invention.

According to the present invention, there is provided a process for producing a thin film magnetic head comprising the steps of:

forming a gap layer 22 of a non-magnetic material on the surface of a substrate 21;

laminating a mask layer 23 on the gap layer 22;

patterning the mask layer 23 to form a shield or visor 23';

etching the gap layer 22, while the shield or visor 23' functions as a mask, thereby forming a gap wall 22' having a width narrower than that of the shield or visor 23';

forming a magnetic pole layer 25 of a soft magnetic material on the surface of the substrate 21, thereby the magnetic pole layer 25 being separated by the gap wall 22'; and, utilizing the gap wall 22' as a magnetic pole gap of the magnetic pole layer 25.

According to the present invention, there is also provided with a thin film magnetic head comprising:

a magnetic pole layer 25 of a soft magnetic material separated by a magnetic pole gap 22', which is a vertical wall of a non-magnetic material having a narrow width and a height substantially higher than the thickness of the magnetic pole layer 25, both of the pole gap 22' and the magnetic pole layer 25 having bottom surfaces at the same level on the thin film magnetic head, while the thickness of magnetic pole layer 25 becomes thinner as the magnetic pole layer 25 approaches the magnetic pole gap 22'.

It is advantageous to form the magnetic pole layer 25 with the shield 23' remaining, whereby the magnetic pole layer 25 is formed around and under the shield or visor 23' and separated by the gap wall 22'.

It is advisable to form the magnetic pole layer 25, whose thickness is gradually thinner towards the gap wall 22', under the shield or visor 23'.

It is desirable to form the gap layer 22 as a multiple layer, whose etching speed is faster in the lower layer than in the upper layer; and, to etch the multiple layer, whereby the width of,the lower layer becomes narrower than that of the upper layer.

It is preferable to form the magnetic pole layer 25 as a multiple layer composed of a soft magnetic material layer and a non-magnetic material layer.

It is convenient to control the width of the magnetic pole layer to be 1 μm or less, preferably 0.5 μm or less.

The advantages of the present invention result from the novel concept that a shield (visor) is used to form the gap wall of a thin film magnetic head.

Firstly, the gap width can be controlled by adjusting the etching time. Even if the gap width is narrow, it is possible to control the gap separator width independently of the resolution degree of the applied resist.

Secondly, it is possible to form the shield or visor width broader than the gap width. Therefore, it is not necessary for the resist, which is used for patterning the shield, to have a high resolution degree, and thus it is not necessary to use electron beam exposure, and it is possible that a usual photoexposure resist can be used and the exposure is effected at one time over the entire surface. Thus it is possible to shorten the time required to form the gap. Furthermore, it is possible to use the magnetic pole material not formed by the plating process, and therefore the variety of the material used for forming the magnetic pole is broadened.

Finally, the thin film magnetic head according to the present invention can be applied not only to a planar type thin film magnetic head, whose magnetic pole layer is parallel to the surface of the recording medium, but also to a vertical type thin film magnetic head, whose magnetic pole layer is vertical to the surface of the recording medium.

BRIEF DESCRIPTION OF THE DRAWINGS

FIGS. 5A to 5E show an example of a vertical type thin film magnetic head;

FIGS. 6A, 7A, 8A, 9A, 10A and 11A illustrate plan views, FIGS. 6B, 7B, 8B, 9B, 10B and 11B vertical sectional views and FIGS. 6C, 7C, 8C, 9C, 10C and 11C side sectional views of a vertical type thin film magnetic head, respectively, sequentially effected in the steps for producing a magnetic head.

DESCRIPTION OF THE PREFERRED EMBODIMENTS

Figure 1A:
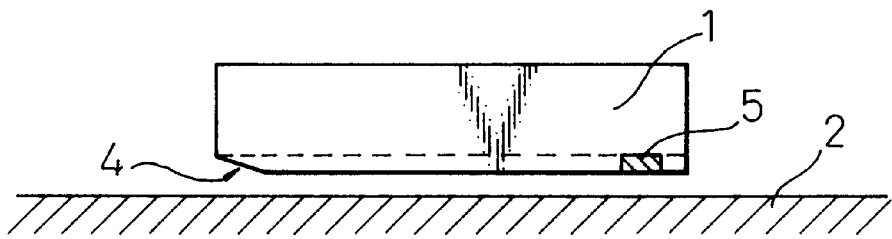
FIG. 1A is a side view of a planar type thin film magnetic head.
Figure 1B:
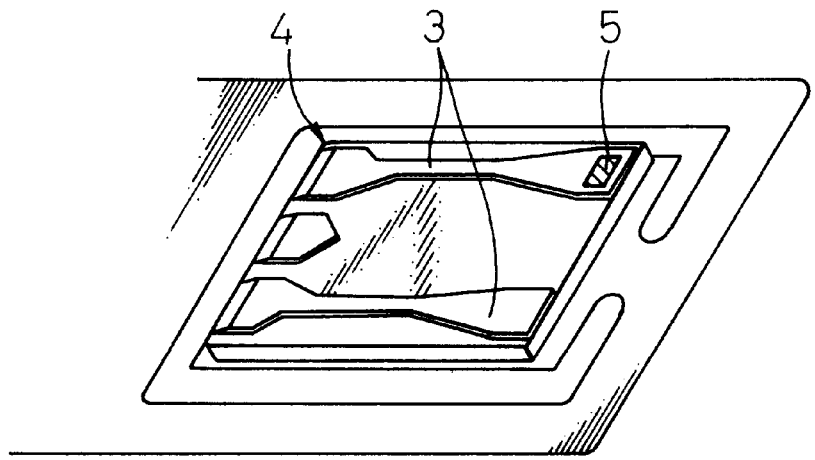
FIG. 1B is a perspective view of a thin film magnetic head as shown in FIG. 1A.
Figure 1C:
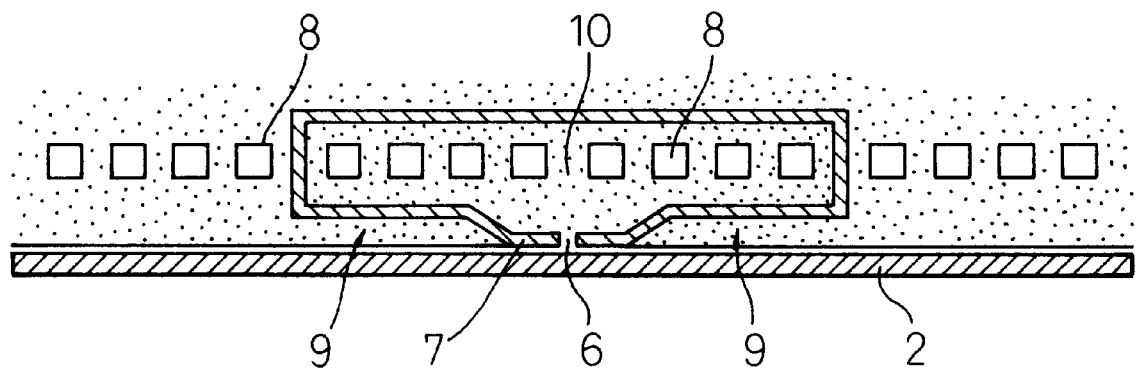
FIG. 1C is a sectional side view of a thin film magnetic head as shown in FIG. 1A.
Figure 2A:
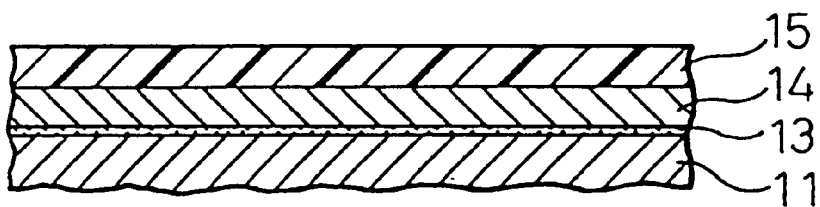
FIGS. 2A to 2D illustrate a process for producing a write gap of a thin film magnetic head according to the prior art.
Figure 2B:
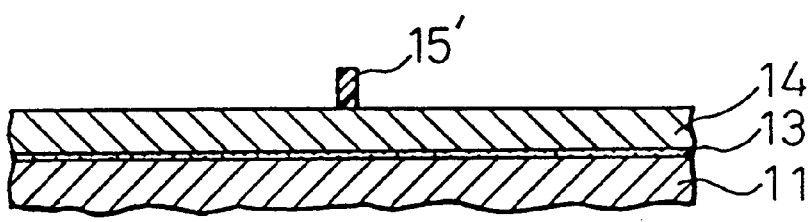
Figure 2C:
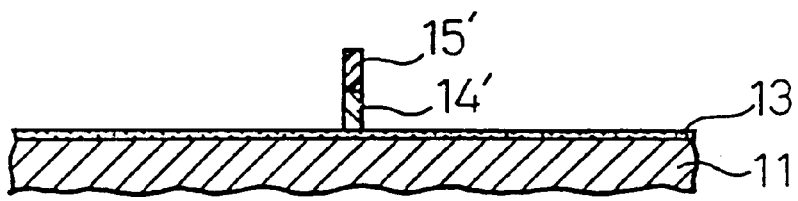
Figure 2D:
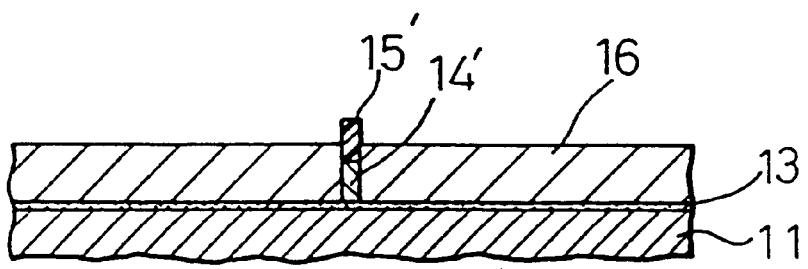

The present invention will be described in detail referring to the drawings.

The process for producing a magnetic pole layer may be effected by one of the following two processes.

The gap layer located under the shield or visor is etched off to form a gap wall which is narrower than the shield or visor. In a process, the shield may be removed and a soft magnetic material may be deposited to form a magnetic pole layer sandwiching the gap wall. In the other process, a soft magnetic material may be deposited around and under the shield, which is not removed.

As for the deposition of the soft magnetic material, sputtering, vapor deposition or plating may be applied. When the shield is not removed and then either sputtering or deposition is applied, the magnetic pole layer is usually deposited in such a manner that the thickness of layer located under the shield becomes gradually thinner as the layer approaches the gap wall (FIG. 3F). When the thickness of the end portions of the magnetic pole layer becomes thinner, the insulation between the magnetic pole layers located on the opposite sides of the gap wall is increased. As a result, the magnetic field leaks from the end portions of the magnetic pole layer into the substrate. Such a leakage of magnetic field is advantageous to the output characteristic of a magnetic head.

As for the material for forming the gap wall, any non-magnetic material, e.g., titanium, alumina or silica may be used. The material adapted for use in forming the shield is also not limited, unless an appropriate etching ratio of the shield material to the gap layer material is available. A ceramic material, e.g., alumina or a metallic material, e.g., aluminum or NiFe may be used.

The process for patterning the shield layer is not specially limited. A usual resist patterning process, i.e., photolithography may be used.

When the non-magnetic material is titanium or silica and the shield material is aluminum or alumina, $CF_4$ may be used as a reactive etching gas. In another case, when a hard-baked resist is used as the non-magnetic material, the reactive etching may be carried out in oxygen, while aluminum or alumina, etc. is used as the shield material.

It is possible that the gap layer is formed as a multiple layer composed of different materials and the etching rates of the layers increasing as they approach the substrate, by which the width of the gap wall may be gradually narrowed from the shield to the substrate. It is also possible to form the gap layer of a single material in such a way that the etching speed increases at the portion nearer the substrate. In these methods, the thickness of the gap wall is more easily controlled, even if the gap width is narrower.

Isotropic etching is used to form a gap wall by means of the shield. A single etching may be applied to effect a vertical etching and an isotropic etching around and under the shield at a time. However, it is preferable that the gap layer is first vertically etched by using the shield as a mask, and then the layer is isotropically etched around and under the shield, to precisely control the pattern. Although various isotropic etching processes are known in the art, reactive etching, which is capable of controlling the etching condition to form the side surfaces of the gap wall vertical to the surface of the substrate, is more advantageous.

According to the invention, it is possible to easily form the gap width as short as less than 1 μm, or less than 0.5 μm, or less than 0.2, or even less than 0.1 μm.

The magnetic pole layer may be formed not only of a single layer of a soft magnetic material, but also of a multiple layer of a soft magnetic material laminated with a non-magnetic insulating layer(s) therebetween.

EXAMPLES

The present invention will be described referring to the following examples.

Figure 3A:
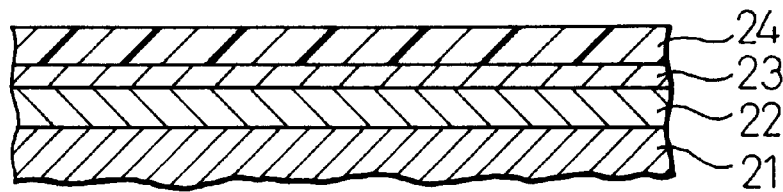
FIGS. 3A to 3F illustrate a process for producing a write gap of a thin film magnetic head according to the present invention.

A gap layer (e.g., 1 μm thick Ti or $SiO_2$) 22, a shield layer (e.g., 0.1 μm thick Al or $Al_2O_3$) 23, and a resist layer 24 are sequentially formed on the surface of a substrate 21 (FIG. 3A).

Figure 3B:
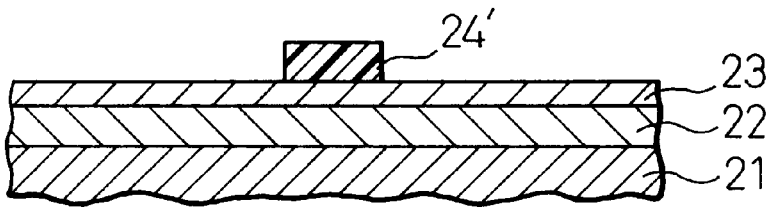
Figure 3C:
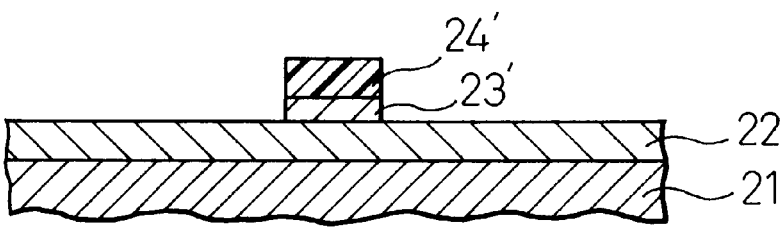

The resist layer 24 is patterned to form a mask 24' of a desired width (e.g., 1 μm) (FIG. 3B). Then, the shield layer 23 is patterned by means of ion milling, etc., to form a shield 23' (FIG. 3C).

Figure 3D:
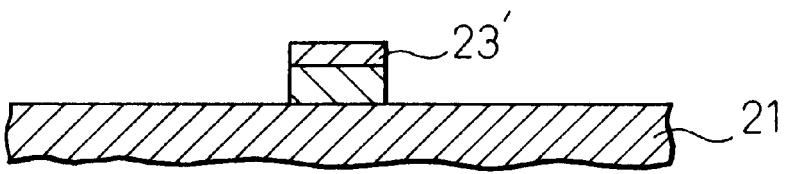
Figure 3E:
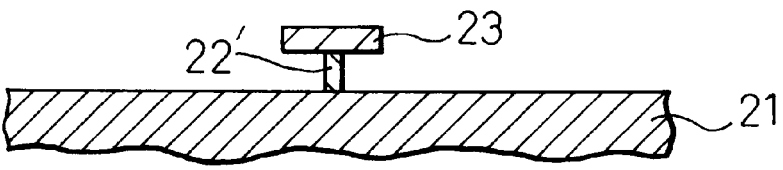
Figure 3F:
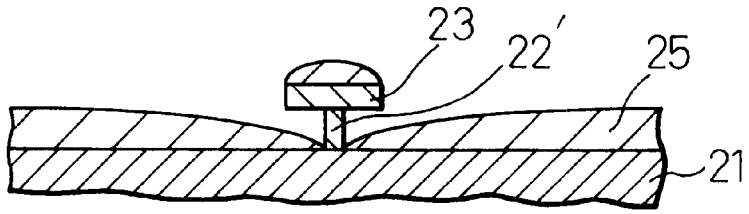
Figure 4A:
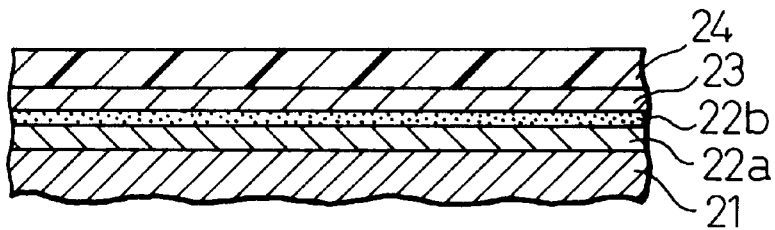
FIGS. 4A to 4F illustrate another process for producing a write gap of a thin film magnetic head according to the present invention.
Figure 4B:
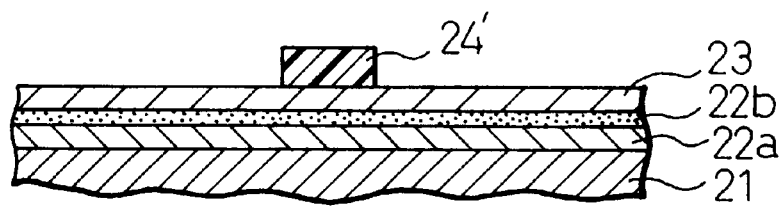
Figure 4C:
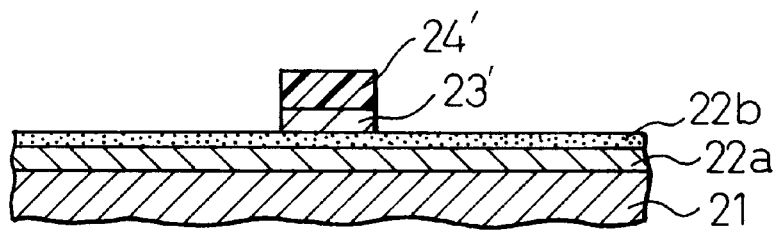
Figure 4D:
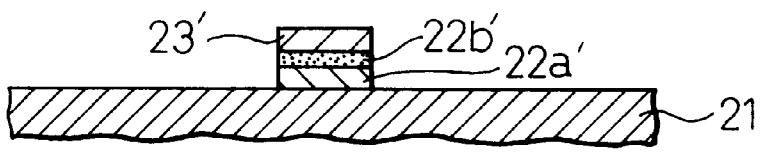
Figure 4E:
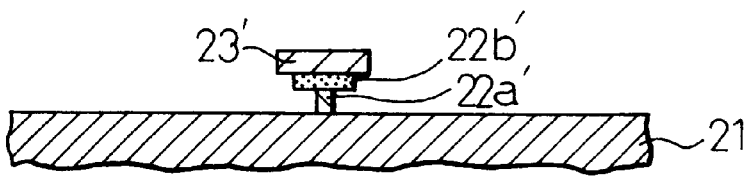
Figure 4F:
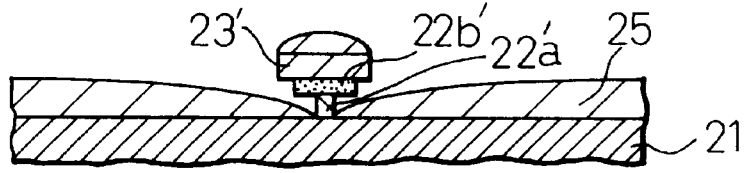

The gap separator layer 22 is reactively etched, while the shield 23' is used as a mask. When $CF_4$ is applied as a reactive gas, the resist mask 24' is etched off, but the shield 23' remains. In this etching, the gap layer 22 is etched of $Al_2O_3$ or the like including the portion under the shield 23'. Thus, the reactive etching invades the gap layer 22 around and under the shield 23' (FIG. 3E). Thus, it is possible to form a gap wall 22' of a desired width (e.g., 0.2 μm) by controlling the etching time. FIG. 3D shows the gap layer 23' after the vertical etching and FIG. 3E shows the gap layer 23' after the isotropic etching.

Finally, a soft magnetic material is sputtered on the surface of the substrate 21 to form magnetic pole layers 25 of about 0.5 μm thickness, which are separated from each other by the gap separator wall 22'. At this time, if the shield 23' is not removed, the magnetic pole layer 25 is formed to gradually decrease its thickness towards the gap separator wall 22' (FIG. 3F). To the contrary, it is possible to form the magnetic pole layer having a uniform thickness, if the shield 23' is removed before sputtering.

It is advantageous to use $Al_2O_3$ as a material of shield 23', because the width of the gap separator wall 22' is confirmed by simple overhead visual observation, and thus the sectional sides of the gap separator wall 22' are easily worked. It is also advantageous to use aluminum as a material of shield 23', because aluminum is easily removed by wet etching after the magnetic pole 25 is formed.

In the process for forming a thin film magnetic head, the shield 23' is usually removed.

FIGS. 4A–4F illustrate another example for forming a thin film magnetic head, wherein the gap layer 22 exhibits a laminated structure consisting of a lower gap layer 22a and an upper gap layer 22b, and the etching rate of the former 22a is faster than that of the latter 22a. It is also possible to use a gap material whose etching rate decreases gradually in the direction vertical to the surface of the substrate. Thus, the gap width is more easily controlled, and also a narrower gap wall is available.

The other operations and the reference numerals of parts shown in FIGS. 4A–4F correspond to those of FIGS. 3A–3F.

FIGS. 5A–5E show an example of a vertical type thin film magnetic head. FIG. 5A shows a slider similar to that in FIG. 1A. FIG. 5B shows the flying side of the slider of FIG. 1A and, in FIG. 5B, a thin film magnetic head 5 is provided in the direction perpendicular to the rail 3. FIGS. 5C–5E show details of the vertical type thin film magnetic head. In these figures, the numerical reference 1 denotes a slider body, 2 a recording medium, 3 a rail, 4 an end taper portion for flowing-in, 5 a thin film magnetic head, 6 a gap, 7 a magnetic pole, and 8 a coil.

FIGS. 6A, 7A, 8A, 9A, 10A and 11A show plan views, FIGS. 6B, 7B, 8B, 9B, 10B, and 11B I—I section views, and FIGS. 6C, 7C, 8C, 9C, 10C and 11C II—II section views of a vertical type thin film magnetic head.

Figure 6A:
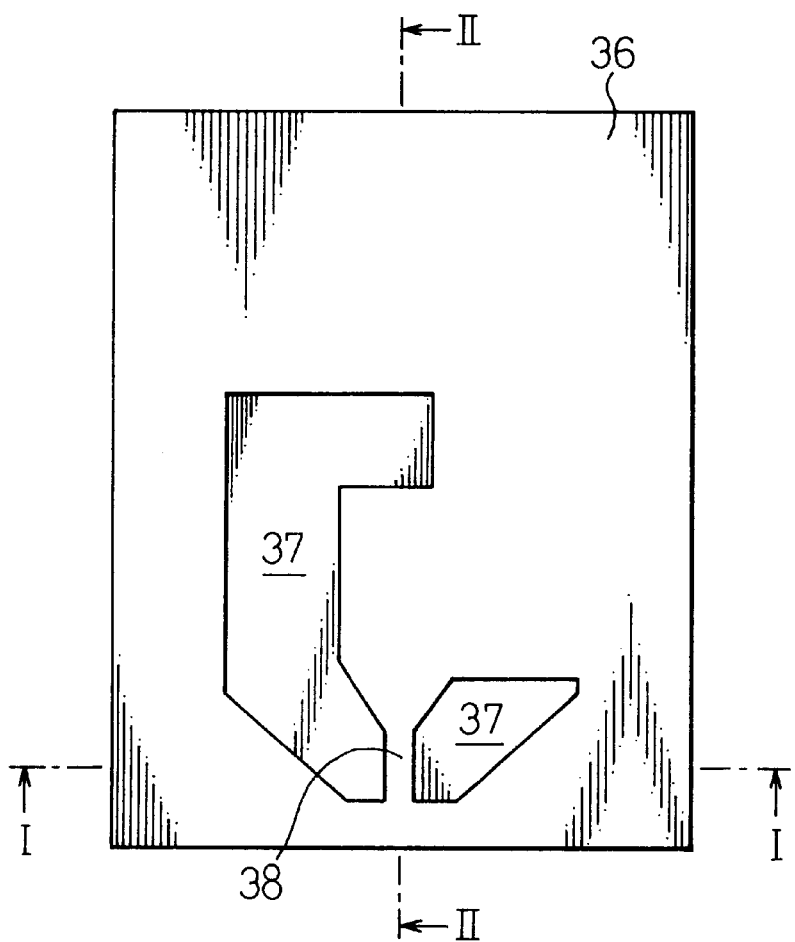
Figure 6C:
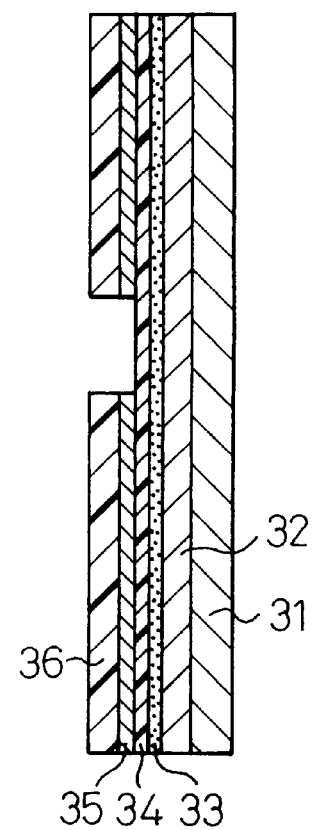
Figure 6B:
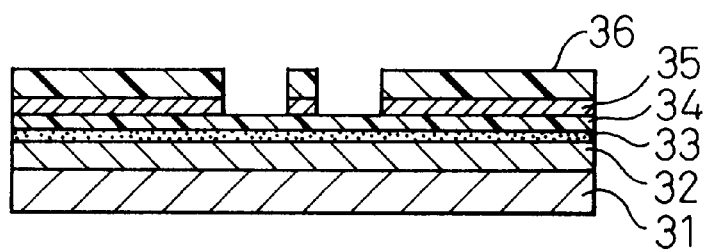

In the step shown in FIGS. 6A–6C, an aluminum insulating film 32, a plated base layer 33, a lower resist layer 34, an alumina mask layer 35, and an upper resist layer 36 are sequentially formed on a substrate 31. Then, a portion of the alumina mask layer 35 is removed to expose a magnetic pole pattern 37, while a shield pattern 38, whose width is broader than that of the magnetic gap wall, is left in the area where the magnetic gap wall is to be formed.

In the step shown in FIGS. 7A–7C, the upper resist layer 36 is removed by means of isotropic etching, and at the same time the etching invades the lower resist layer 34 around and under the shield 38 to form a gap separator wall 34', whose width is narrower than that of the shield 38.

Figure 8A:
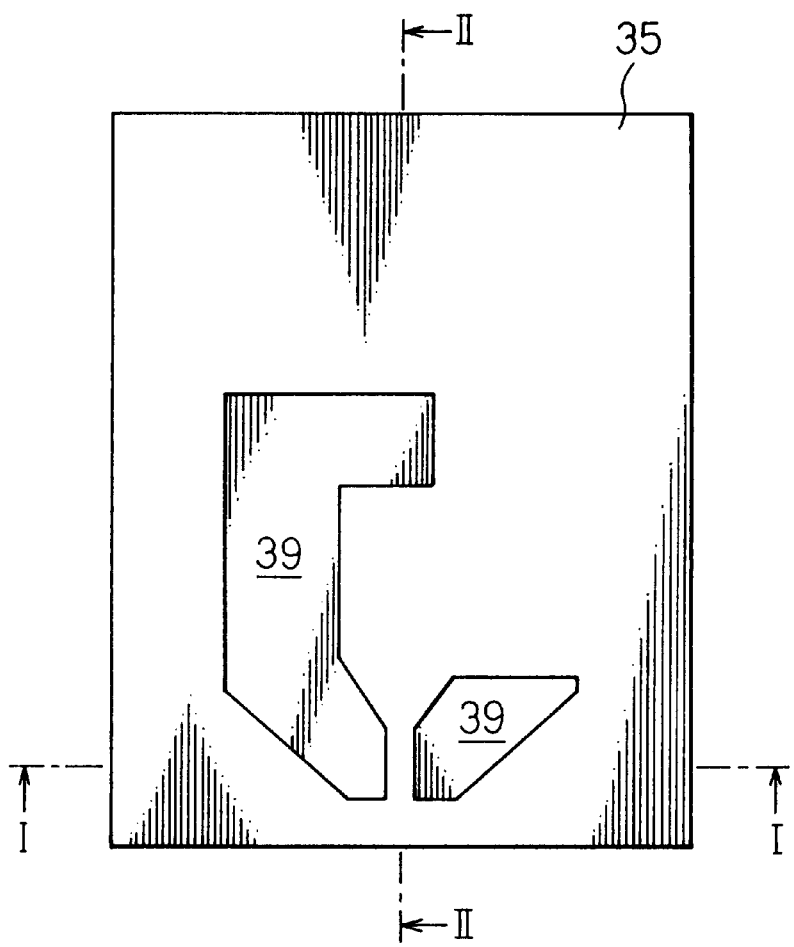
Figure 8C:
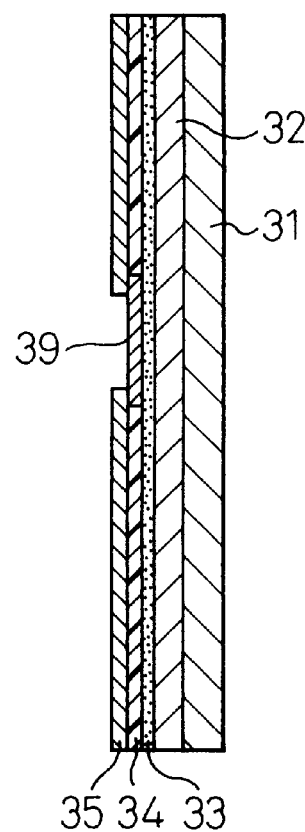
Figure 8B:
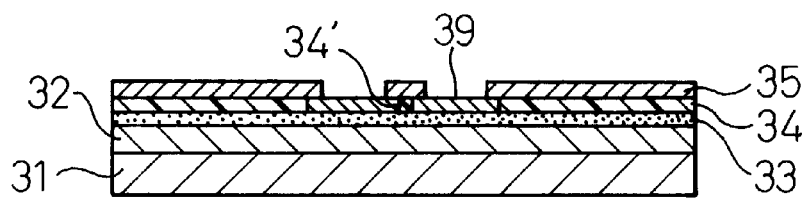

In the step shown in FIGS. 8A–8C, the alumina mask layer 35 is removed, and then a soft magnetic material (i.e., NiP) is selectively plated to form patterns of lower magnetic pole 39.

Figure 9A:
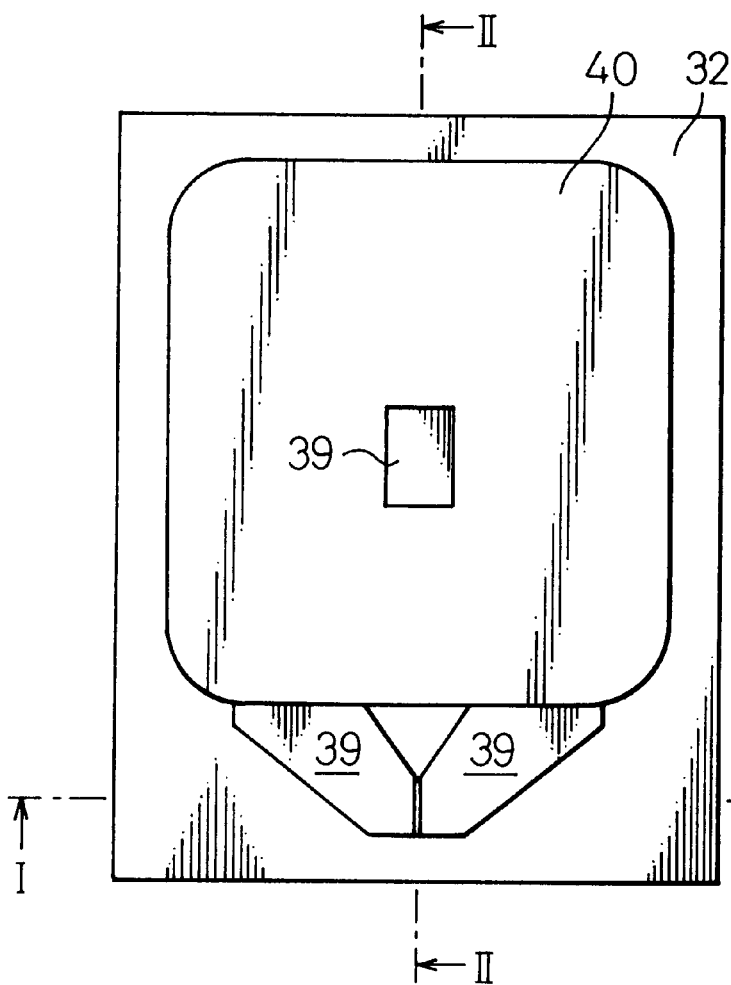
Figure 9C:
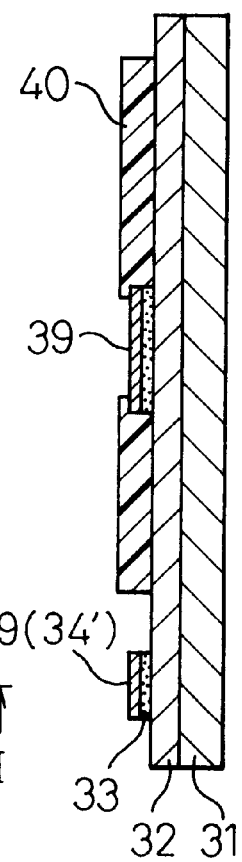
Figure 9B:
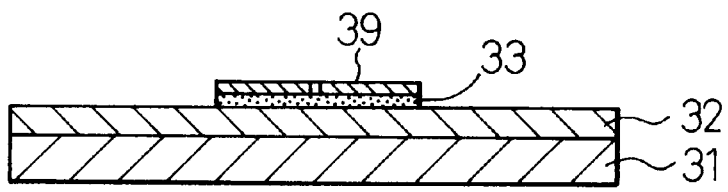
Figure 11A:
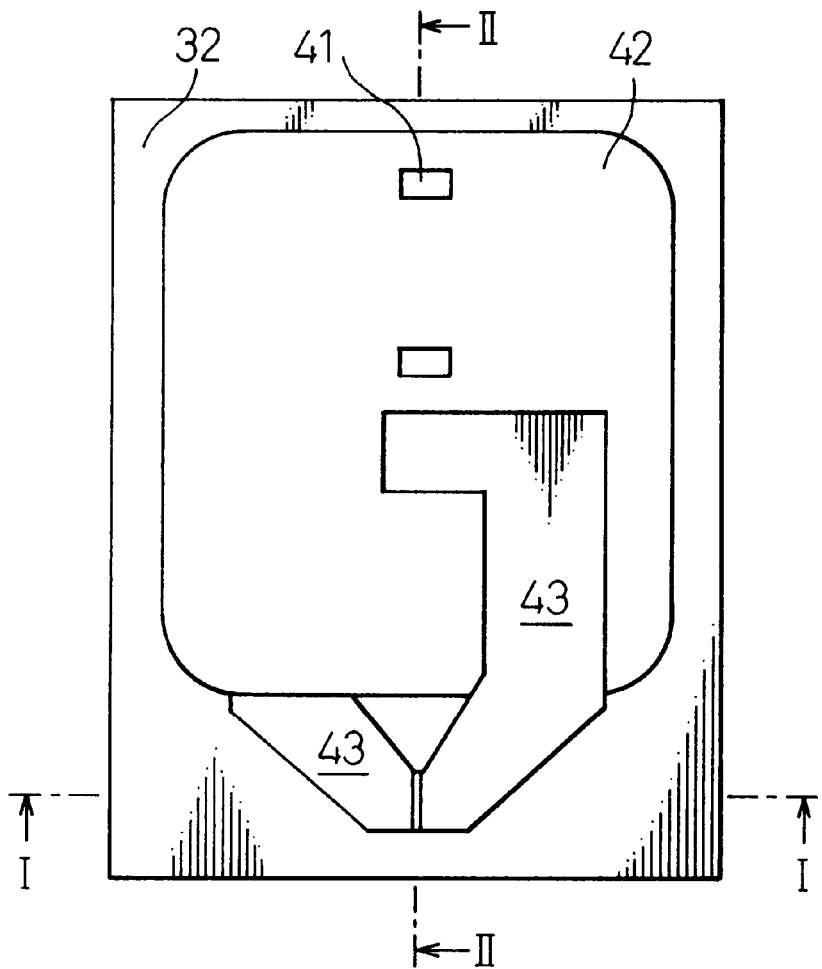
Figure 11C:
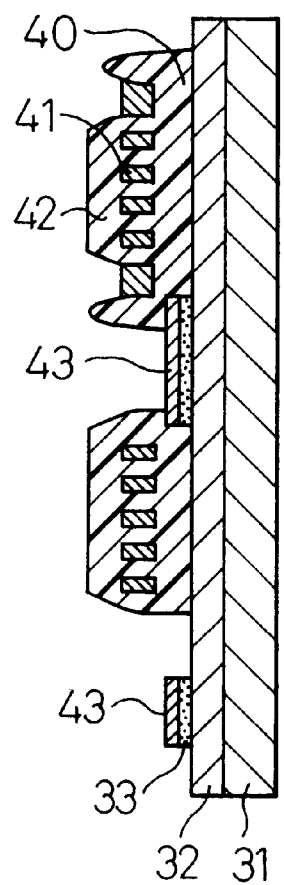
Figure 11B:
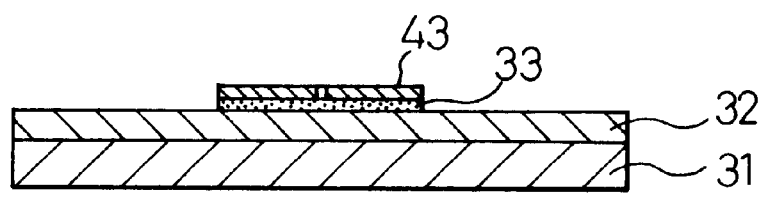

In the step shown in FIGS. 9A–9C, a resist insulating layer 40 is formed as a lower insulating layer, then a copper coil 41 is formed as shown in FIGS. 10A–10C, and finally, a resist insulating layer 42 and an upper magnetic pole 43 are formed as shown in FIGS. 11A–11C.

In the process for producing a vertical type thin film magnetic head set forth above, it is possible to form a gap separator wall according to the present invention, similarly to the steps set forth referring to FIGS. 3A–3F and 4A–4F.

What we claim is:

1. A process for producing a thin film magnetic head comprising the steps of:

forming a gap layer of a non-magnetic material on the surface of a substrate;

forming a mask layer on said gap layer;

patterning said mask layer to form a shield;

etching said gap layer, while said shield functions as a mask, to form a gap wall having a width narrower than that of said shield;

forming a magnetic pole layer of a soft magnetic material on the surface of said substrate, said magnetic pole layer being separated by said gap wall; and utilizing said gap wall as a magnetic pole gap of said magnetic pole layer.

2. A process according to claim 1, wherein said step of forming said magnetic pole layer is conducted while said shield remains, so that said magnetic pole layer is formed around and under said shield and is separated by said gap wall.

3. A process according to claim 2, wherein said magnetic pole layer is formed in such a manner that the thickness is gradually thinner towards said gap wall under said shield.

4. A process according to claim 1, wherein said gap layer is formed as a multiple layer, whose etching speed is faster in the lower layer than in the upper layer, so that the width of the lower layer becomes narrower than that of the upper layer after said etching.

5. A process according to claim 1, wherein said magnetic pole layer is formed as a multiple layer composed of a soft magnetic material layer and a non-magnetic material layer.

6. A process according to claim 1, wherein the width of said gap formed in said magnetic pole layer is controlled to be 0.5 μm or less.

7. A thin film magnetic head made by the process of:
   forming a gap layer of a non-magnetic material on the surface of a substrate;
   forming a mask layer on said gap layer;
   patterning said mask layer to form a shield;
   etching said gap layer, while said shield functions as a mask, to form a gap wall having a width narrower than that of said shield;
   forming a magnetic pole layer of a soft magnetic material on the surface of said substrate, said magnetic pole layer being separated by said gap wall; and
   utilizing said gap wall as a magnetic pole gap of said magnetic pole layer.

8. The thin film magnetic head of claim 7 wherein said step of forming said magnetic pole layer is conducted while said shield remains, so that said magnetic pole layer is formed around and under said shield and is separated by said gap wall.

9. The thin film magnetic head of claim 8 wherein said magnetic pole layer is formed in such a manner that the thickness is gradually thinner towards said gap wall under said shield.

10. The thin film magnetic head of claim 7 wherein said gap layer is formed as a multiple layer, whose etching speed is faster in the lower layer than in the upper layer, so that the width of the lower layer becomes narrower than that of the upper layer after said etching.

11. The thin film magnetic head of claim 7 wherein said magnetic pole layer is formed as a multiple layer composed of a soft magnetic material layer and a non-magnetic material layer.

12. The thin film magnetic head of claim 7 wherein the width of said gap formed in said magnetic pole layer is controlled to be 0.5 μm or less.

* * * * *